M. MEYERS.
FEEDING MECHANISM FOR CUTTING-OFF MACHINES.
APPLICATION FILED MAR. 13, 1913.
1,081,764.
Patented Dec. 16, 1913.
2 SHEETS—SHEET 2.
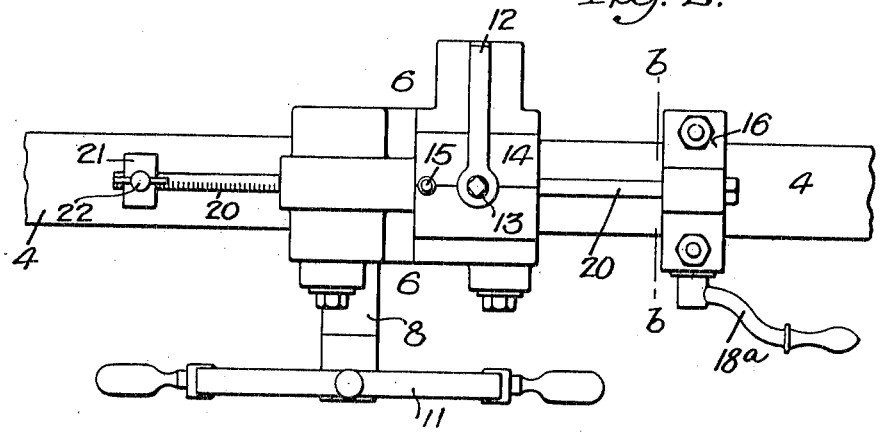
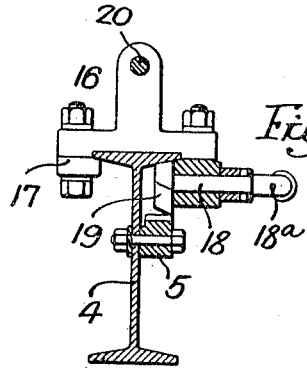
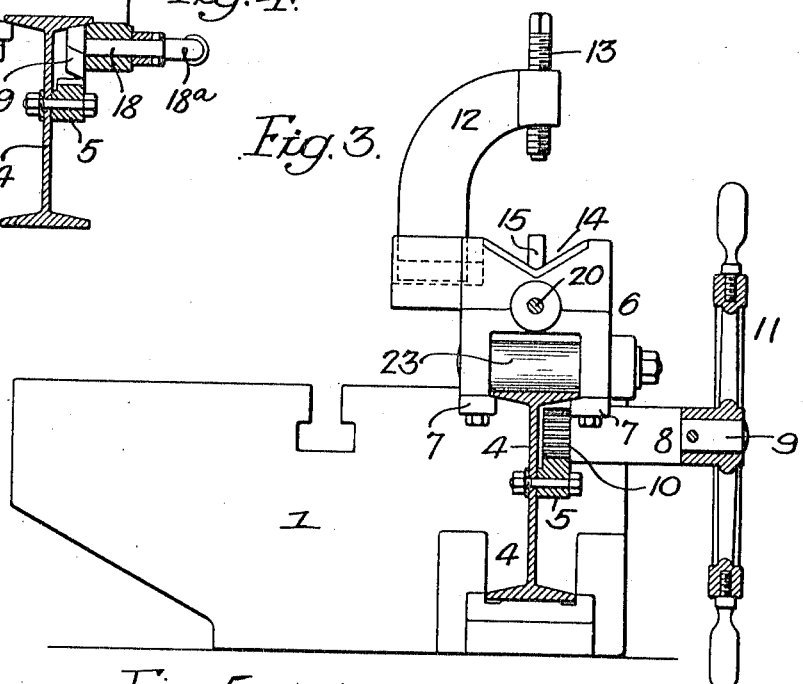
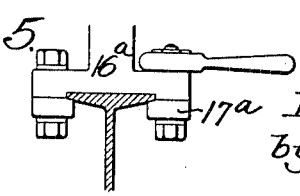

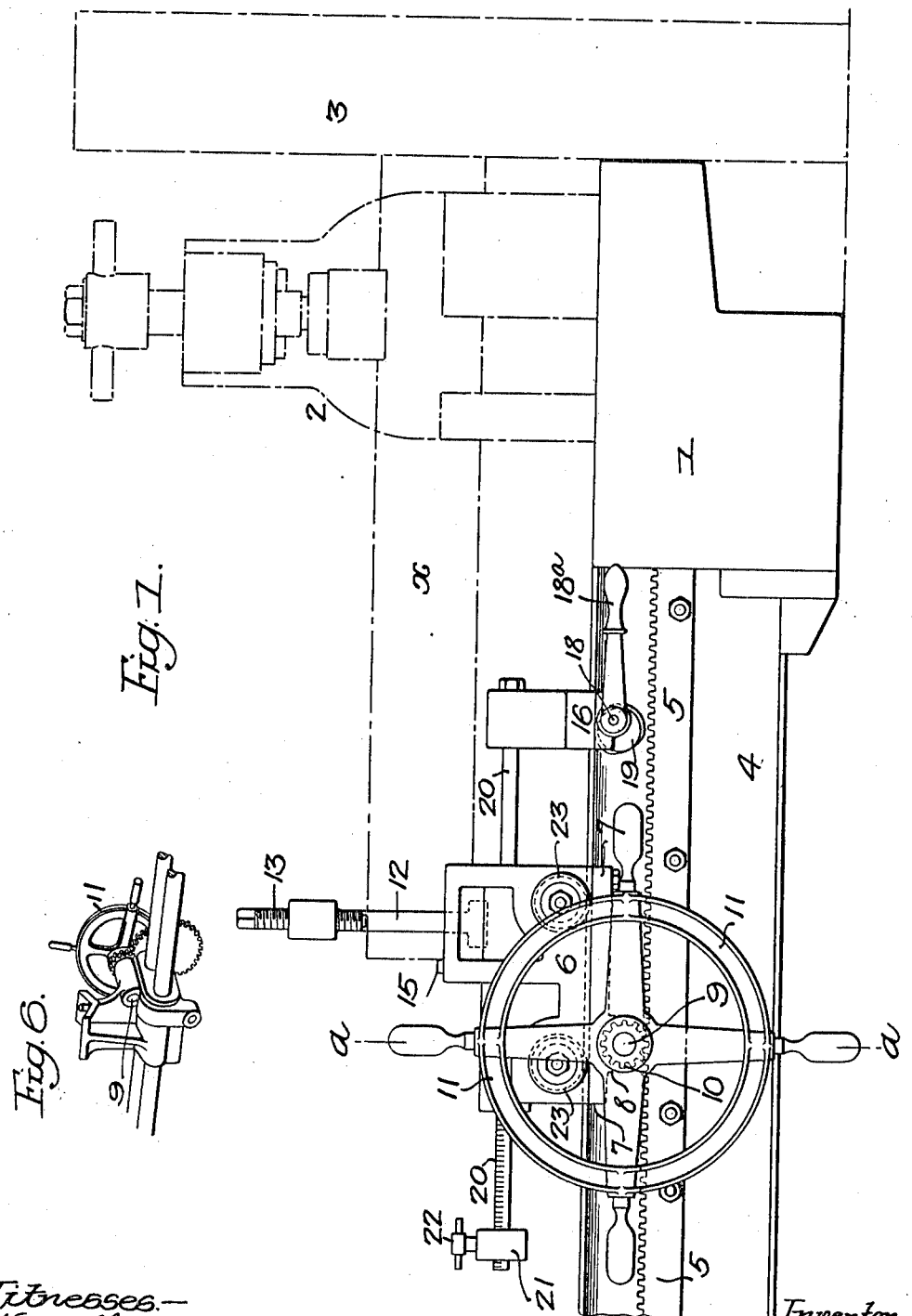

UNITED STATES PATENT OFFICE.

MAX MEYERS, OF PHILADELPHIA, PENNSYLVANIA, ASSIGNOR TO NEWTON MACHINE TOOL WORKS, INCORPORATED, OF PHILADELPHIA, PENNSYLVANIA, A CORPORATION OF PENNSYLVANIA.

FEEDING MECHANISM FOR CUTTING-OFF MACHINES.

1,081,764.     Specification of Letters Patent.     Patented Dec. 16, 1913.

Application filed March 13, 1913. Serial No. 754,018.

*To all whom it may concern:*

Be it known that I, MAX MEYERS, a citizen of the United States, residing in Philadelphia, Pennsylvania, have invented certain Improvements in Feeding Mechanism for Cutting-Off Machines, of which the following is a specification.

The object of my invention is to construct a device for accurately feeding bars, or other shapes, to a cutting off or other tool so that after the device is once set the bar can be cut off, for instance, in sections of the same length. This object I attain in the following manner, reference being had to the accompanying drawings, in which:

Figure 1 is a side view illustrating my improvement and showing a cutting off tool in dotted lines; Fig. 2 is a plan view; Fig. 3 is a transverse sectional view on the line *a—a*, Fig. 1; Fig. 4 is a section on the line *b—b*, Fig. 2, and Figs. 5 and 6 are views of modifications of certain features of the invention.

Referring to the drawings, 1 is a part of the base of a cutting tool on which is the clamp 2 shown by dotted lines.

3 is the main framework of the cutting off tool.

Projecting from the base 1 is an I-beam 4, in the present instance, which is supported by any suitable means at its outer end and secured to one side of the web of the I-beam is a rack 5.

6 is a carriage mounted on the I-beam and having plates 7 which underlap the upper flange of the beam so as to hold the carriage in the proper position. In order that the carriage may be readily adjusted on the I-beam, I mount two rollers 23 on the carriage which rest directly on the top of the I-beam so that when the hand wheel is turned, the carriage can be readily shifted.

Adapted to bearings 8 on the carriage is a shaft 9 having a pinion 10, which meshes with the rack 5 and on the outer end of this shaft is a hand wheel 11 by which it is turned to traverse the carriage on the I-beam to and from the cutting tool.

Projecting upwardly from the carriage is a goose-neck 12 which has a clamping screw 13 and directly under the clamping screw is a V-shaped recess 14 for the reception of the bar *x* to be cut, said bar being shown by dotted lines in Fig. 1. Projecting upwardly from the V-shaped groove is a stop pin 15, which bears against the end of the bar *x*. The goose-neck is detachably mounted on the carriage and has a T-head adapted to slide in the carriage.

16 is a head arranged to be clamped to the upper flange of the I-beam. Said head has plates 17 which underlap the upper flange of the beam and mounted in a bearing on one of the plates is a shaft 18 on which is a cam 19 having a face beveled to engage the under portion of the flange of the beam.

18ª is a handle secured to the shaft so that, on turning the handle, the head 16 can be clamped to the beam or released therefrom.

20 is a rod attached to the head 16 and this rod extends through an opening in the carriage 6 and has an adjustable collar 21 at its outer end, which can be locked to the rod by a handled set screw 22. The rod is preferably graduated, as shown in Fig. 1, so that the collar can be more readily set in the proper position.

The operation is as follows:—The bar *x* to be cut in given lengths is mounted in the V-slot in the carriage and is held by the clamp screw, as shown in Fig. 1. If it be desired to cut the bar in one foot lengths, then the end of the bar is placed in position at the cutting off tool while the carriage is located directly under the opposite end of the bar with the pin 15 resting against the said end. The collar 21 on the rod is then loosened and the head 16 adjusted so as to come in contact with the forward end of the carriage. The distance between the rear end of the carriage and the forward end of collar should be twelve inches and the collar is adjusted to this point after which it is securely fastened to the rod. Then the head 16 is moved on the I-beam until the collar strikes the end of the carriage, after which the head is fastened to the I-beam and the carriage, with the bar to be cut off, is moved forward until the end of the carriage comes in contact with the head. The cutting off tool is then set in motion, cutting off the bar one foot from the end. While this cutting off tool is operating, the head is unclamped from the beam and is again moved forward until the collar comes in contact with the rear of the carriage, when it is fastened, and, as soon as the bar is cut off, the carriage is moved forward until it comes in contact with the head and another foot of the bar will project beyond the cutting off tool. By this means the entire bar can be cut in one foot lengths, or in any lengths desired. After the carriage has been moved up and the bar $x$ is in position to be cut off, it is held on the main frame by the clamp 2, as shown in dotted lines, Fig. 1.

In place of the clamping cam shown in Fig. 4, the bolts which hold the plate 17ª to the head 16ª may be made adjustable to clamp the head to the beam, as shown in Fig. 5.

Two or more rods, as illustrated in Fig. 6, may be used instead of the I-beam and intermediate gearing may be used between the pinion and the shaft 9, as shown in said figure.

I claim:

1. The combination in a feeding device for cutting off or other tools, of a beam; a carriage longitudinally adjustable on the beam; a clamp on the carriage by which the bar to be cut is secured thereto; a head adjustable longitudinally on the beam; a rod projecting from the head and extending through the carriage; and an adjustable collar on the rod.

2. The combination in a feeding device for cutting off or other tools, of a base; a beam projecting from the base; a carriage mounted on the beam; means for adjusting the carriage; a clamp on the carriage by which the bar to be cut is secured to the carriage; a head located on the beam in advance of the carriage; a rod mounted in the head and extending rearwardly through the carriage, said bar being graduated; and an adjustable collar on that portion of the rod projecting to the rear of the carriage.

3. The combination in a feeding device for cutting off and other tools, of a beam having a flange at its upper end; a rack on the beam; a carriage adapted to slide on the flange in the beam; a shaft on the carriage having a pinion meshing with the rack and a hand wheel by which it is turned; a detachable clamp mounted on the carriage for securing the bar to be cut thereto; a head adjustably mounted on the beam in advance of the carriage; a rod extending rearwardly from the head through an opening in the carriage; an adjustable collar on the outer end of the rod beyond the carriage, said carriage having V-shaped groove to receive the bar to be cut; and a stop pin projecting from the V-shaped groove against which the end of the bar rests.

In testimony whereof, I have signed my name to this specification, in the presence of two subscribing witnesses.

MAX MEYERS.

Witnesses:
 WM. E. SHUPE,
 WM. A. BARR.